Inventors
CHARLES G. PROCTER
NORMAN Z. ALCOCK
by: Fetherstonhaugh + Co.
Att'ys.

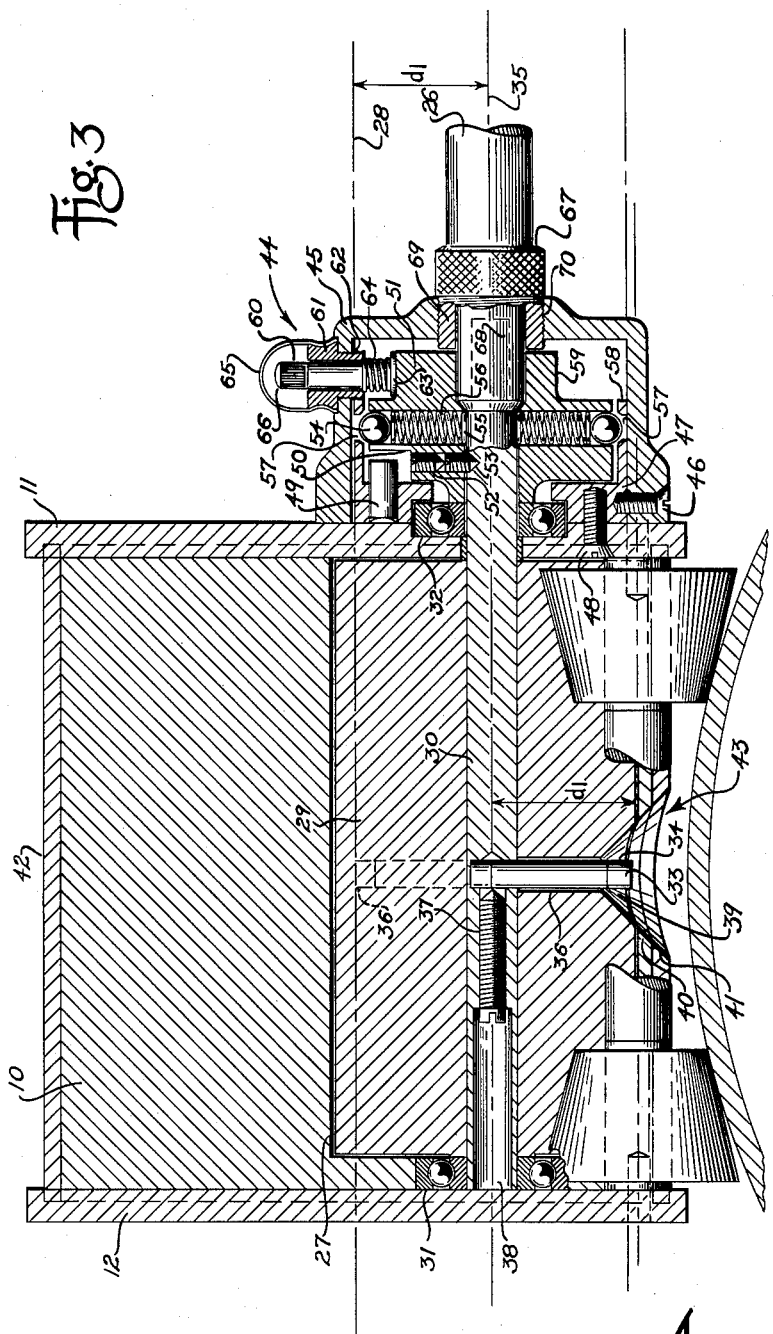

United States Patent Office 2,719,926
Patented Oct. 4, 1955

2,719,926

METHOD AND APPARATUS FOR RADIOGRAPHIC EXAMINATION OF HOLLOW ARTICLES

Charles G. Procter, Burlington, Ontario, and Norman Z. Alcock, Oakville, Ontario, Canada, assignors to Isotope Products Limited, Oakville, Ontario, Canada, a company of Ontario Application August 15, 1952, Serial No. 304,626

5 Claims. (Cl. 250—65)

This invention relates to a method and apparatus for radiographic examination of welds and faults in pipes and like hollow articles.

Prior radiography apparatus for the examination of welds in pipes and the like comprise an X-ray device including an X-ray tube unit driven by a motor generator or a bank of heavy batteries. Such equipment is not readily portable and is generally characterized by a cone of radiation not easily adapted to objects of circular symmetry. Special X-ray tubes have been made with wide angle beams but because the X-ray tube proper must of necessity be of relatively large size, it is not possible to place the source of X-rays close to the surface of the pipe. Moreover, the source of X-rays may not be effectively a point source when viewed from all points of the field subjected to radiation and therefore it will be apparent that only a small portion of a complete circumferential weld in a pipe may be examined at any one time with conventional X-ray apparatus. Usually, a plurality of exposures numbering six or more, must be made with such prior apparatus to obtain a picture of the entire weld.

The radiography apparatus of the invention employs a radio-active isotope emitting gamma rays over an effective angle of 360° as compared with an angle of emission of approximately 30° for the emitter of an X-ray tube. It is a prime object of the present invention to incorporate such an isotope in radiography apparatus in the form of a remotely controllable portable structure readily adaptable for the examination of many classes of welds in small and relatively large objects and which is particularly adapted to the examination of pipe welds in pipes of various diameters.

It is another object of the invention to provide radiography apparatus wherein a radio-active isotope source is located substantially immediately adjacent that portion of the object to be examined and whereby a complete circular weld in a pipe can be examined in a minimum number of exposures of a photographic plate or film.

A further object of the invention is to provide radiography apparatus in the form of a body of gamma radiation shield material such as lead, having a rotatable shutter element therein carrying the source material near its periphery and which is adapted at one position to dispose the source substantially at the outer surface of said body.

With these and other objects in view, the radiography apparatus of the invention generally comprises a relatively large body of gamma ray shielding material having, rotatably supported therein, a shutter element composed of a gamma ray shielding material and carrying a radio-active isotope source emitter near its periphery. Means are provided for rotating the shutter element to a position to dispose the source carried thereby substantially at the centroid of said body and being also adapted to rotate the shutter element to another position at which the source is disposed substantially at the outer surface of said body. Supporting means are provided for said body whereby the body may rest against the surface of an object to be examined in such manner that when the source of a shutter element is disposed substantially at the surface of the body it is in close proximity to the surface of the object.

Preferably, the apparatus also includes a warning device in conjunction with the shutter element operating means whereby the operator will be warned when the source is disposed in a position away from the centroid of the gamma ray shielding body.

Other objects of the invention will be apparent from a study of the following specification taken in conjunction with the accompanying drawings disclosing one preferred form of the invention adapted to be considerably modified by skilled persons without departing from the spirit of the invention set forth herein.

In the drawings:

Figure 3 is a sectional view on the line 3—3 of Figure 2.

Figure 1:
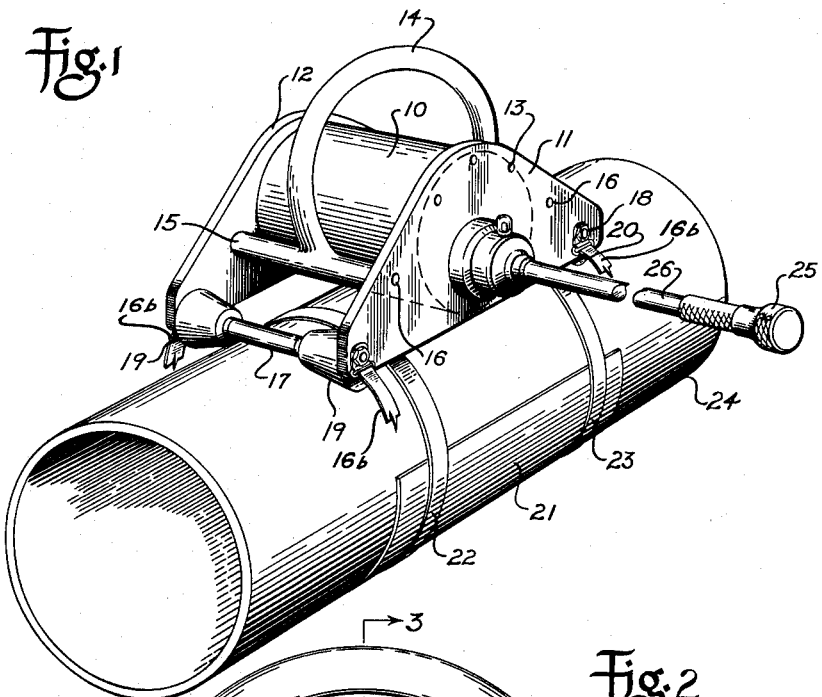
Figure 1 is a perspective view of a radiography apparatus of the invention illustrating its manner of use.
Figure 2:
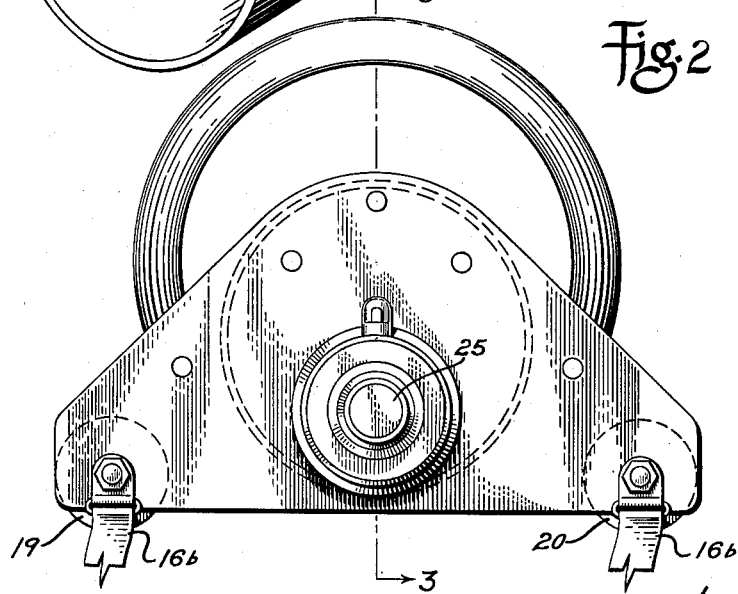
Figure 2 is an elevation of the apparatus of Figure 1.

In the preferred construction illustrated in the drawings, the apparatus of the invention comprises a relatively large mass of lead or similar gamma ray shielding material formed into a cylindrical body 10 having support plates 11 and 12 fastened to the ends thereof by suitable screws 13. The carrying handle 14 having cross bar 15 at the ends thereof, is fastened by the latter to the support plates by means of screws 16. A pair of non-rotating axles 17 and 18 disposed substantially at the outward ends of the supporting plates extend therebetween to carry roller bearing mounting frustro-conically contoured wheels 19 and 20 adapted to dispose the outer surface of the body 10 in predetermined proximity to the surface of various diameters of pipe against which the apparatus may be placed. The apparatus may be secured to the object being examined by any suitable means such as the straps 16b extending from the ends of support plates 11 and 12.

As illustrated in Figure 1, a photographic film 21 may be fastened by straps 22 and 23 to a pipe 24 on which the apparatus is set. An exposure of the photographic plate to radiation passing through the walls of the pipe from the apparatus shown, is accomplished by the operator turning the shutter actuating knob 25 which may be mounted on the free end of a substantial length of flexible shafting 26.

Referring to Figure 3, the internal construction of the apparatus is shown in section disclosing an internal bore 27 in the body 10, the axis of which is disposed a distance $d_1$ from the cylindrical axis 28 of the body. A shutter element 29 of cylindrical form and comprised of a gamma ray shielding material such as lead, is of a size adapted to fit freely within the bore 27, being of cylindrical form supported by the shaft 30 in the bearings 31 and 32.

A radio-active isotope source of the gamma emitting class such as iridium 192, cerium 144 or cobalt 60, is supported within the source head 33 of an emitter cartridge 34 at a distance $d_1$ from the axis 35 of the shutter element 29. The cartridge is supported in a transverse bore 36 in the shutter element, and is locked therein by means of a locking screw 37 inserted through the socket 38 of a shaft 30. In this way, if the shaft 30 is rotated 180° from the position illustrated in Figure 3, the source head 33 will arrive at position illustrated at 36 in chain lines substantially at the centroid of the body 10 contained in the axis 28 thereof.

When the source is disposed in the operative position, hereinafter referred to as the "open shutter position" of the shutter element 29, shown in Figure 3, the diverging collimating recess 39 of the shutter element will be in indexed relationship with the diverging openings 40 and 41 of the spherical body 10 and the tubular body casing 42. The effect is to form a collimating opening about the source head 33 defining an aperture 43 therefor of a predetermined effective aperture angle when the shutter element is disposed in the open position illustrated.

A shutter positioning device 44 is preferably incorporated in the apparatus of the invention and is designed to control the positioning of the shutter to two specific positions so that the operator may be sure that the source head 33 is disposed either substantially at the centroid of the body 10 corresponding to the closed position of the shutter or is disposed at the open position illustrated in Figure 3. The device 44 comprises a hollow casing 45 fixed by screws 46 to an internal mounting ring 47 fastened to support plate 11 by suitable screws 48. The ring 47 carries a fixed outwardly projecting stud 49 extending into a semi-annular recess 50, preferably of 180° extent, set into the collar 51 fastened to the shaft 30 by means of locking screws 52 and 53.

At the two limiting positions of rotatable movement of collar 51 together with shaft 30 in the actuation of the shutter element 29, the spring biased balls 54 biased by means of springs 55 in radial bores 56, engage the diametrically opposed sockets 57 of the annular flange portion 58 of the inner ring 47.

The collar 51 also carries a cam surface 59 adapted to control the outward movement of the indicator rod 60 slidable in fitting 61 threaded into the casing 45 as at 62 and spring biased from its head 63 by spring 64 against the fitting in the manner indicated. A substantially hemispherical window dome 65, preferably of a transparent plastic material, extends over the exposed portions of the fitting 61 and permits the outward end 66 of the indicator rod 60 to be extended to the position illustrated in Figure 3 to give warning that the shutter element 29 is in the open position.

Accordingly, the outward end portions 66 may be painted red or other suitable warning colour.

The flexible shaft 26 is fastened to shaft 30 in a substantially conventional manner by means of a socket 67 engaging a male portion 68 of shaft 30. The socket part 67 is freely rotatable in the bushing 69 adapted to be fastened into the threaded opening 70 of the casing 45.

It will be apparent from the foregoing, and Figure 1, that the apparatus of the invention in use is disposed on an exterior surface of a pipe diametrically opposed to the surface to be examined, while the radiation sensitive film 21 is disposed adjacent the surface to be examined on the exterior surface of the pipe.

What we claim as our invention is:

1. Radiography apparatus for examining a pipe wall, and comprising in combination: a body of gamma ray shielding material having an opening therein; a gamma ray emitting source of the radio-active isotope class supported within said body; a shutter element of similar shielding material mounted in said body and adapted to occlude said opening and upon actuation to reveal the latter to said source for emission of gamma rays from said opening; means for supporting a radiation sensitive film on an exterior surface of the pipe to be examined; and means for supporting said body and the source therein a predetermined distance from an opposite exterior surface of said pipe.

2. Radiography apparatus as claimed in claim 1, in which the supporting means for said body comprise: frustro-conical wheels operatively connected to said body arranged in coaxial pairs at right angles to the axis of the pipe to which they are to be applied and diverging outwardly substantially from a medial line therebetween.

3. Radiography apparatus comprising, in combination: a body of gamma ray shielding material; a bore in said body parallel to a centroid axis thereof and of a diameter substantially equal to one-half the diameter of said body; a shutter element substantially conforming in dimension to said bore and formed of a gamma ray shielding material; a gamma ray emitting source component of the radio-active isotope class supported in said shutter element a distance equal to substantially one-half the diameter thereof from the axis of rotation of said shutter element; a collimating aperture in said shutter element diverging outwardly from the gamma ray emitting source supported therein; a shaft rotatably mounting said shutter element having one end extending exteriorly of said body; a transverse bore in said shaft adapted to receive a portion of said source component; an axial bore in said shaft extending from said transverse bore to an end of said shaft; and locking means in said axial bore for retaining said source component positioned in the transverse bore of said shaft.

4. Radiography apparatus comprising, in combination: a body of gamma ray shielding material; a bore in said body parallel to a centroid axis thereof and of a diameter substantially equal to one-half the diameter of said body; a shutter element substantially conforming in dimension to said bore and formed of a gamma ray shielding material; a gamma ray emitting source component of the radio-active isotope class supported in said shutter element a distance equal to substantially one-half the diameter thereof from the axis of rotation of said shutter element; a collimating aperture in said shutter element diverging outwardly from the gamma ray emitting source supported therein; a shaft rotatably mounting said shutter element in the bore of said body; and a flexible shaft connectible to said shaft for actuating said shutter element.

5. Radiography apparatus comprising, in combination: a body of gamma ray shielding material; a bore in said body parallel to a centroid axis thereof and of a diameter substantially equal to one-half the diameter of said body; a shutter element substantially conforming in dimension to said bore and formed of a gamma ray shielding material; a gamma ray emitting source component of the radio-active isotope class supported in said shutter element a distance equal to substantially one-half the diameter thereof from the axis of rotation of said shutter element; a collimating aperture in said shutter element diverging outwardly from the gamma ray emitting source supported therein; a shaft rotatably mounting said shutter element in the bore of said body; a cam mounted on said shaft; and an indicator member actuable by said cam upon rotation of said shutter element.

References Cited in the file of this patent

UNITED STATES PATENTS

| | | |
|---|---|---|
| 2,340,923 | Boucher | Feb. 8, 1944 |
| 2,412,174 | Rhoades | Dec. 3, 1946 |
| 2,477,648 | Piggot et al. | Aug. 2, 1949 |
| 2,607,012 | Siebert | Aug. 12, 1952 |
| 2,622,209 | Hjulian et al. | Dec. 16, 1952 |